(No Model.) 2 Sheets—Sheet 2.
E. H. LANCASTER.
CORN PLANTER.
No. 352,923. Patented Nov. 23, 1886.
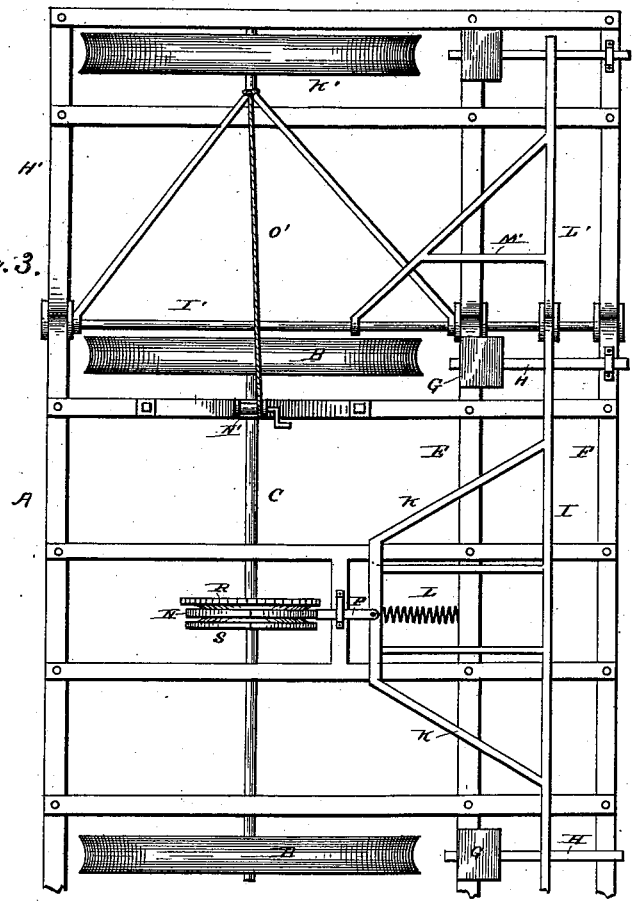
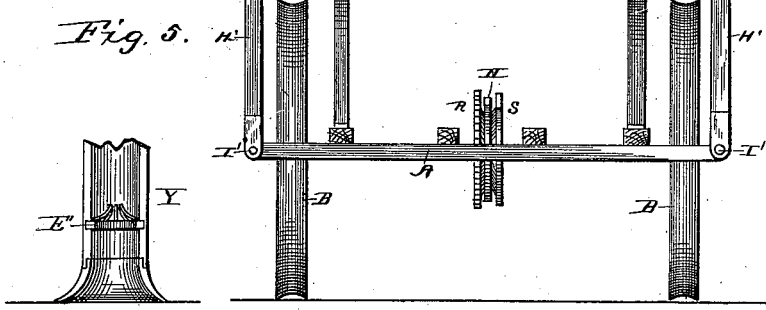
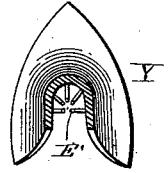
Witnesses
J. C. Jenkins
Chas. W. Davis
Inventor
E. H. Lancaster
By his Attorney
W. A. Alexander

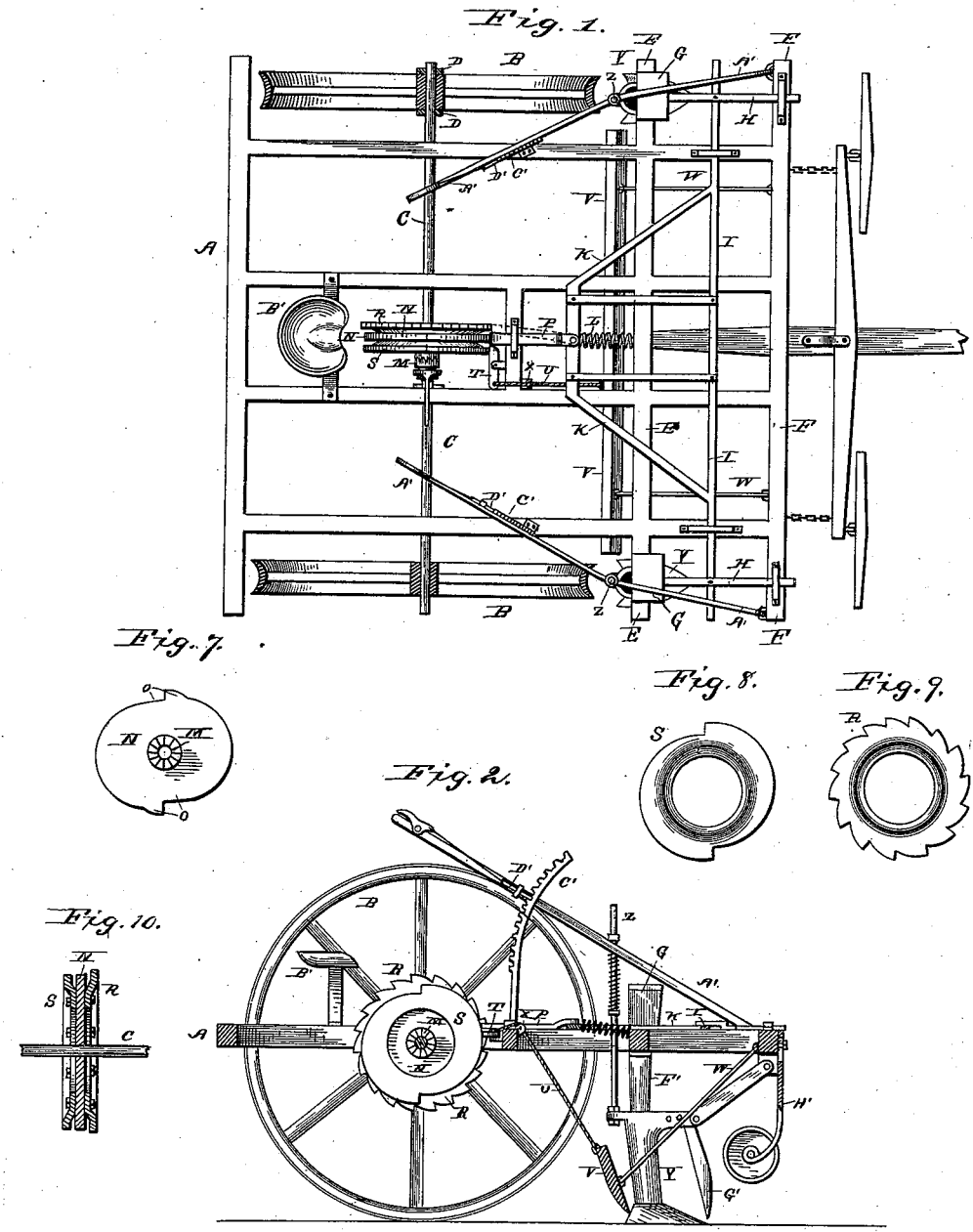

UNITED STATES PATENT OFFICE.

ELIAS H. LANCASTER, OF MARION, INDIANA.

CORN-PLANTER.

SPECIFICATION forming part of Letters Patent No. 352,923, dated November 23, 1886.

Application filed February 18, 1886. Serial No. 192,340. (No model.)

*To all whom it may concern:*

Be it known that I, ELIAS H. LANCASTER, a citizen of the United States, residing at Marion, in the county of Grant and State of Indiana, have invented certain new and useful Improvements in Corn-Planters, of which the following is a specification, reference being had therein to the accompanying drawings.

This invention relates to improvements in planters, and is designed to produce a check-row planter that shall be adapted to planting continuously as well as intermittently, also one that shall plant two or four rows, as may be desired.

The improvement consists, essentially, in the constructions and combinations, as hereinafter described, and particularly set forth in the claims.

In the drawings, Figure 1 represents a plan view of the planter; Fig. 2, a longitudinal vertical section thereof; Fig. 3, a plan view showing a device for planting an additional row; Fig. 4, an end view of the device, with the side or auxiliary planters elevated; Fig. 5, a detail rear view of one of the shoes; Fig. 6, a transverse section of said shoe; Fig. 7, a detail view of one of the dropper-operating cams; Fig. 8, a similar view of the marker-operating cam; Fig. 9, a similar view of a ratchet-cam for producing a continuous dropping; and Fig. 10, a vertical cross-section through the devices shown in Figs. 7, 8, and 9, when in their proper position.

The main frame A is supported upon the wheels B, which are secured upon the axle C, one of the wheels turning freely on said axle, and adjustable on the same by means of the collars D, and the other wheel adjustably fixed to said axle, so that the wheel and axle will turn conjunctively. The front of the frame A is provided with two parallel lateral timbers, E and F. On the ends of the timber E are secured the seed-boxes G, through or under which pass the slides H, the said slides being also guided on the timber F, which is arranged in front of the timber E. The slides are connected by a lateral timber, I, parallel to and between the said timbers E and F, and which timber carries a suitable frame, K, extending rearward, and carrying between its extreme rearward end and the timber E a spring, L, which latter has a constant tendency to force the said frame K, timber I, and slides H toward the back of the planter.

On the axle C, and receiving motion therefrom by means of a clutch, M, is a cam, N, (see Fig. 7,) having its periphery provided with a suitable number of inclines and shoulders, (two being shown,) with a short portion, as at O, preceding the shoulder, at which points during the revolution of the said cam no motion is imparted thereby. This cam engages with a pawl-arm, P, pivoted to the frame K, so as to have a lateral adjustment, and causes the slides H to move backward and forward with a momentary rest at the end of the said backward motion.

To one side of the cam N is bolted or otherwise secured the disk or frame R, having its periphery provided with a series of short inclines and shoulders, and being similar in shape to a ratchet-wheel, may, for the purpose of distinction, be termed a "ratchet-cam." On the other side of the cam N is a cam disk or frame, S, with inclines and shoulders corresponding in number to those on the cam N.

The above constructions are clearly shown in Figs. 7, 8, 9, and 10, and their position in the planter in Figs. 1, 2, 3, and 4.

The cam S engages with a pawl, T, pivoted to the frame A. From the said pawl extends a rope or cord, U, to the marker, which consists of a board, V, extending across the machine to the rear of the dropping mechanism, and pivotally supported by rods W, secured to the timber F. The cord U passes over a pulley, X, placed between the pawl T and marker V. As the said pawl is moved by the cam S, the said marker is raised, and when the pawl is released the marker drops by gravity and enters the ground sufficiently to leave an impression. The marking is so arranged as to locate the position of the grain deposited by the said dropping mechanism, as is usual in this class of machines.

When it is desirable to drill the grain continuously without marking, the pawl P is moved from the cam N to the cam R, so that the operation of the slides is comparatively rapid, because of the number of the inclines, and the planting is thereby practically continuously performed.

The shoes are shown at Y, and are each supported by a pivoted link extending to the timber F, and by a rod, Z, connected to the rear upper end of said shoe and extending upward through a lever-arm, A'. This rod Z passes freely through said arm A' and is provided with collars both above and below the lever-arm, between which and the lower one of said collars is a spring, whereby a limited adjustment of said shoe is permitted without moving said lever, and the passage of obstructions or over unevenness of ground facilitated. As shown, the said levers A' are pivoted to the timber F and extend obliquely rearward to near the driver's seat B', and are held in any desired position by the racks C', in which the pawl D', operated by a thumb-lever, engages. As is evident, the levers A' may be operated to depress the shoes into the ground, or may elevate them above the same.

In the heel of each shoe is placed a spreader, E', (shown in Figs. 5 and 6,) and consisting of a frame with arms extending inward and upward to an apex, so as to cause the grain to be thrown outward within the limit of the shoe, and thus prevent the bunching of said grain when being dropped. From the grain-boxes to the shoe is a funnel or guide, F', to direct the deliverance of the said grain.

In front of the shoes are secured the cutters G', and to the timber F are secured the vertically-adjustable wheels H', which prevent the front of the planter from being too much depressed.

The main supporting-wheels B travel directly behind the drilling mechanism, and act as packers, the periphery being grooved, as shown; but should the soil be moist and the packing of the earth above the grain unnecessary and objectionable, the said wheels, by means of their adjustment on the axle, are then moved out of line of the said drilling mechanism.

In Figs. 3 and 4 are shown frames H', one on each side of the main planter, connected thereto by the pivotal rod I'. These frames H' each carry a supporting-wheel, K', and a dropping mechanism exactly similar to those on the main machine. The timber I is connected by a joint to a similar timber, L', for operating the dropping mechanism, which timber L' is braced by a frame, M', moving on the rod I'. By means of a windlass, N', and rope O' the said frames H' and mechanism thereon may be elevated, as shown in Fig. 4. The purpose of the side planters is to permit four rows being planted at one time, while excessive length of parts is obviated and flexibleness obtained, thus preventing strain. The purpose of the momentary rest in the planting is to enable the driver to see the grain before it is dropped, and thus ascertain whether the device is operating properly.

I claim—

1. In a planter, a changeable planting mechanism consisting of a cam with inclines containing short non-operative portions, a cam secured thereto with inclines of corresponding length, and a cam also secured to the first or main cam and having short inclines, the whole being secured to the axle, combined with connected grain-dropping slides, and a marker operated by said cams, substantially as specified.

2. In a planter, a changeable planting mechanism consisting of a main cam with inclines, a cam with corresponding inclines secured thereto, and a cam with short inclines also secured to the main cam, the whole being secured to the axle, combined with connected grain-dropping slides, and a marker operated by said cams, substantially as specified.

In testimony whereof I affix my signature in presence of two witnesses.

ELIAS H. LANCASTER.

Witnesses:
W. D. ALEXANDER,
C. D. DAVIS.